Figure 1:
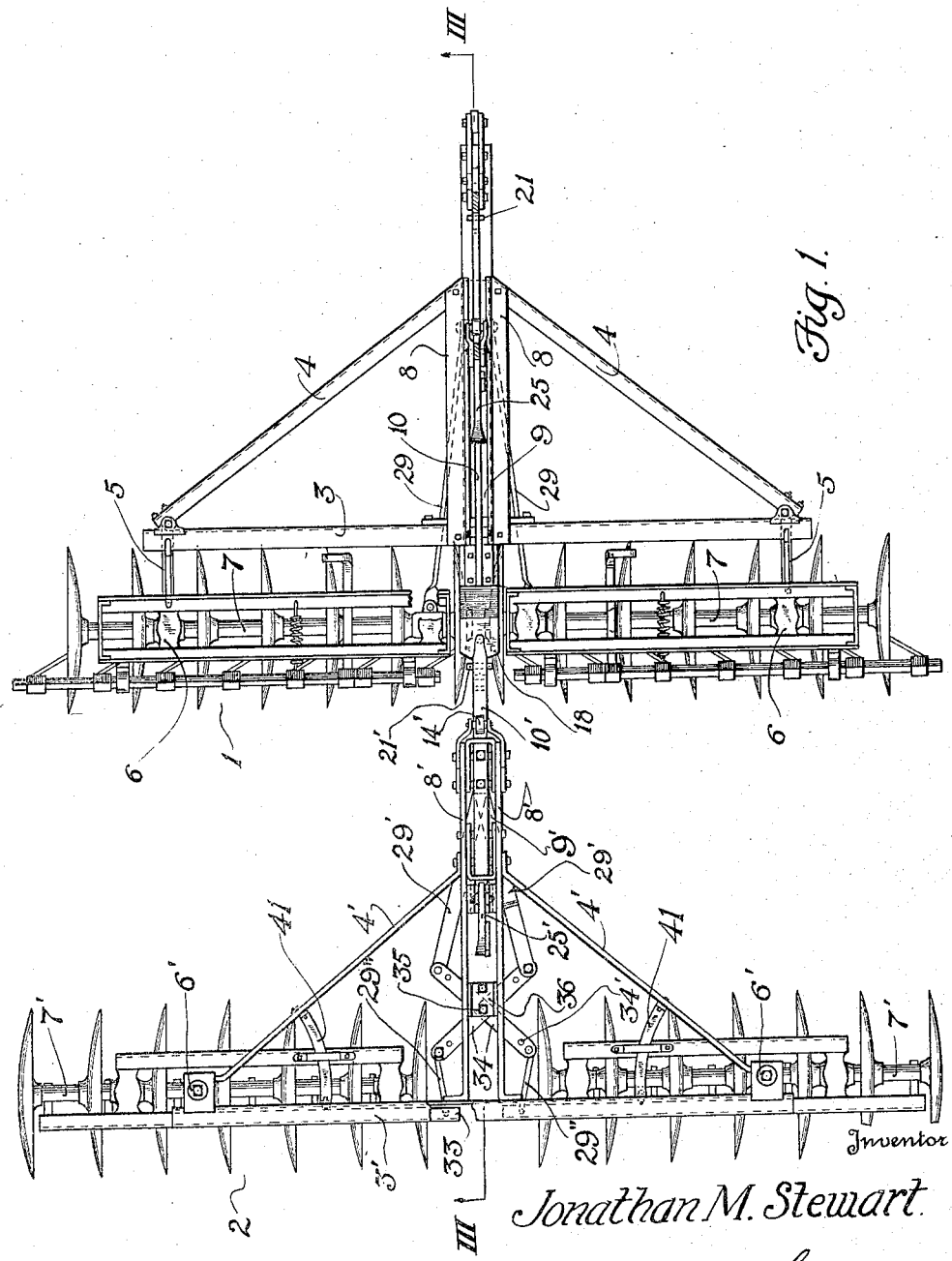

June 17, 1924.

J. M. STEWART

DISK HARROW

Filed Feb. 17, 1921

1,497,956

4 Sheets—Sheet 1

Inventor
Jonathan M. Stewart.
By Frease, Merkel, Saywell and Bond
Attorney

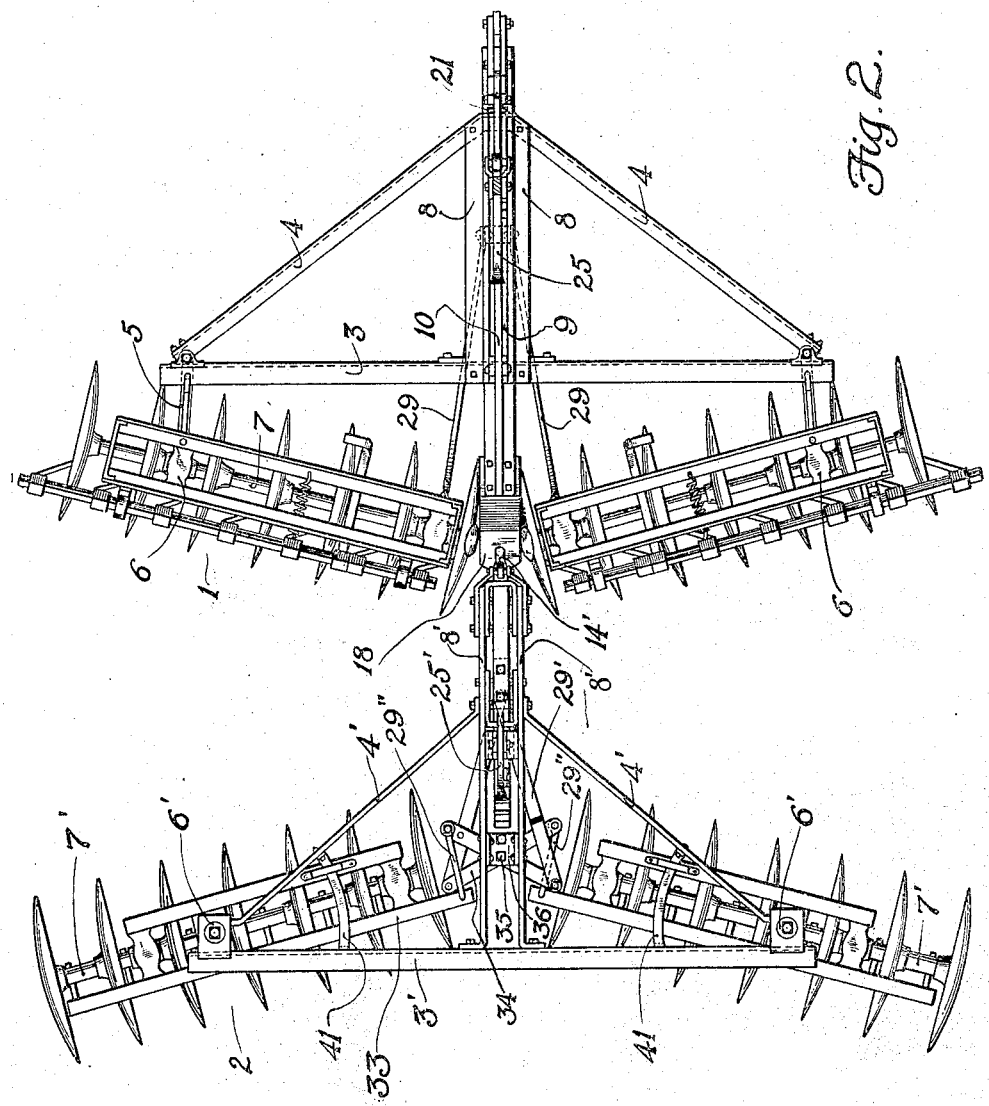

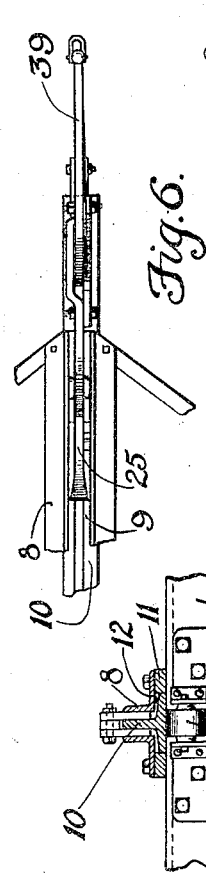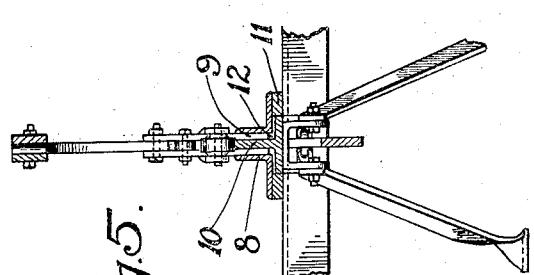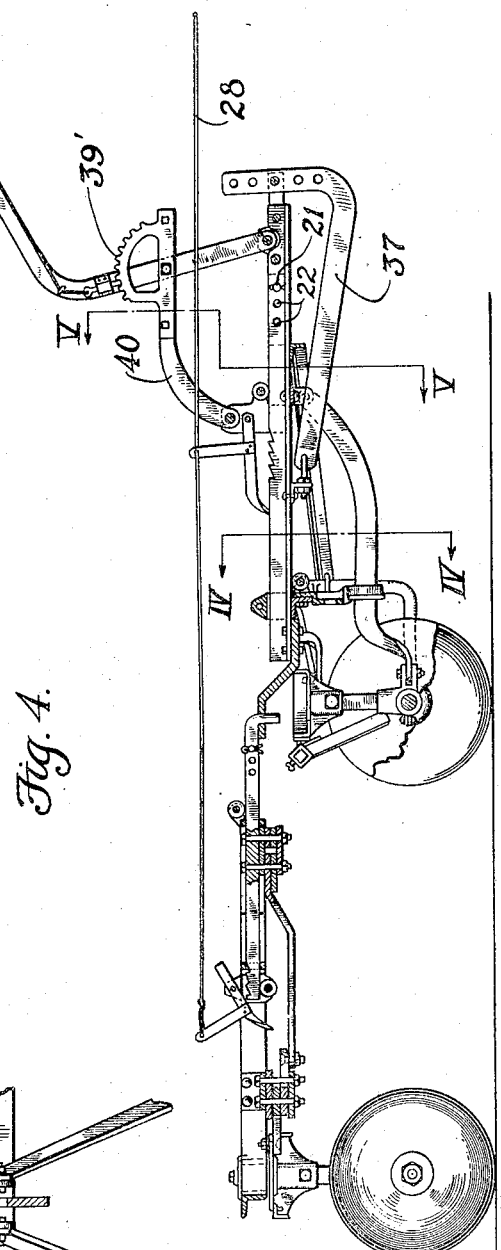

June 17, 1924. 1,497,956
J. M. STEWART
DISK HARROW
Filed Feb. 17, 1921 4 Sheets-Sheet 4
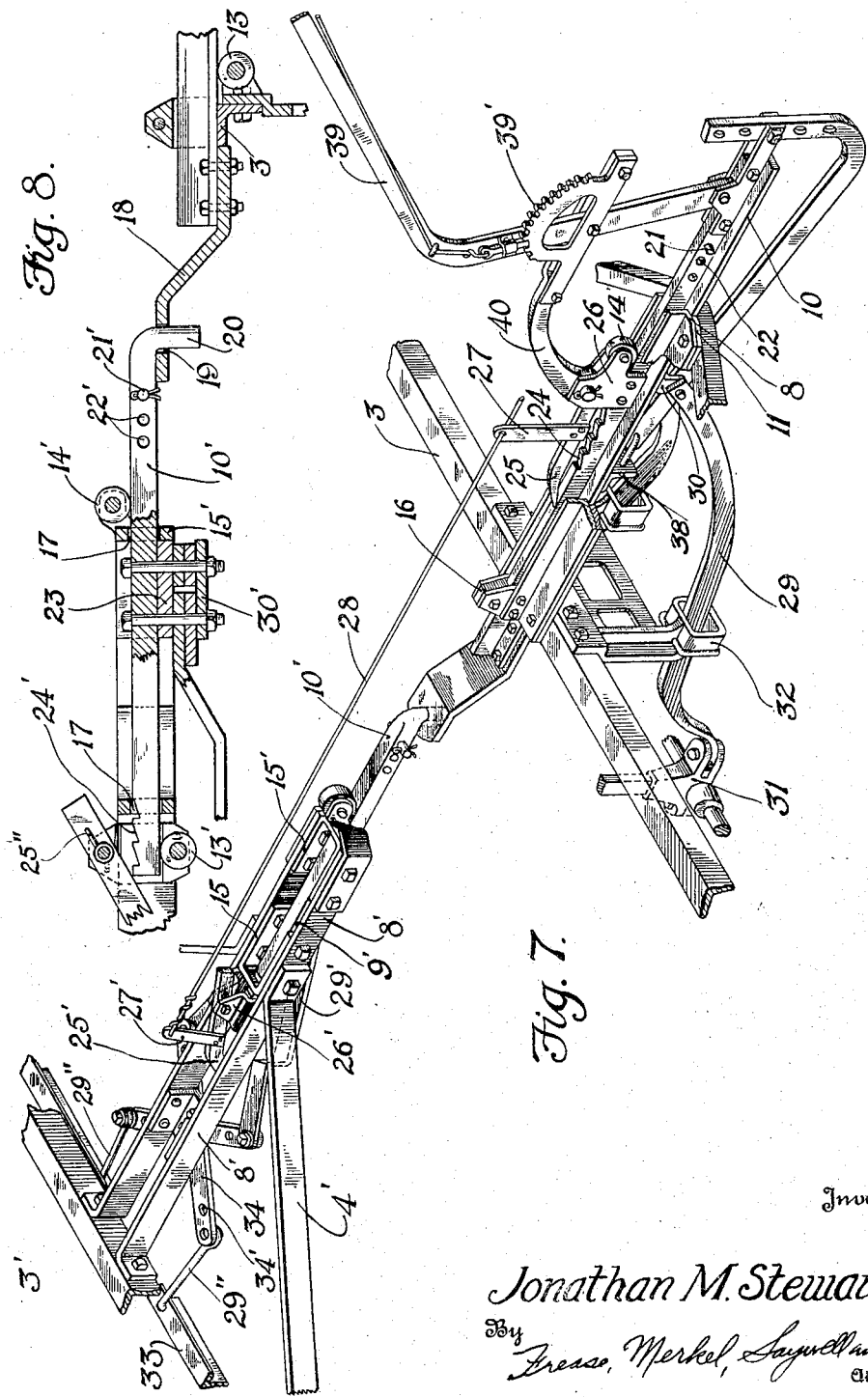
Inventor
Jonathan M. Stewart Patented June 17, 1924.

1,497,956

UNITED STATES PATENT OFFICE.

JONATHAN M. STEWART, OF CANTON, OHIO, ASSIGNOR TO THE BUCHER AND GIBBS PLOW COMPANY, OF CANTON, OHIO, A CORPORATION OF OHIO.

DISK HARROW.

Application filed February 17, 1921. Serial No. 445,590.

*To all whom it may concern:*

Be it known that I, JONATHAN M. STEWART, a citizen of the United States, and a resident of Canton, in the county of Stark and State of Ohio, have invented certain Improvements in Disk Harrows, of which the following is a specification.

The invention relates to double cut disk harrows; and the object of the improvement is to provide simple means for swinging the gangs to operative angles by pushing the draft bar backward, with locking means which may be released to permit the gangs to swing into parallel arrangement by pulling the draft bars forward.

A further object of the improvement is to embody the angling and straightening means for the respective gangs in a forward out-throw harrow and a rearward in-throw harrow connected together by a single central pivot, so as to retain the features of construction which have become standard for the simpler harrows of this type, and to operate the angling and straightening means without changing the distance between the front and rear harrow frames.

The objects of the invention are attained by providing a longitudinal channel or guideway extending forward from each harrow frame, by mounting draft bars to slide endwise in said guideways with releasable means for locking the draft bars from forward movement in the guideways, and operative connections between the draft bars and the inner ends of the corresponding gangs, such operating means including crossed levers in one of the harrows.

An embodiment of the invention is illustrated in the accompanying drawings forming part hereof, in which—

Figure 1 is a plan view of the improved harrow showing the gangs swung into parallel relation, and omitting the angling lever and its bracket;

Fig. 2, a similar view showing the gangs swung or angled in operative relation;

Fig. 3, is a longitudinal section on line III—III, Fig. 1, showing the operating lever which may be used;

Fig. 4, a cross section on line IV—IV, Fig. 3;

Fig. 5, a cross section on line V—V, Fig. 3;

Fig. 6, a fragmentary plan view of the operating lever;

Fig. 7, a fragmentary perspective view of the draft bars and their guideways, showing the operative connections;

Fig. 8, an enlarged longitudinal section on the median line of the rear draft bar showing the rear end of the front draft bar.

Similar numerals refer to like parts throughout the drawings.

The front out-throw harrow 1, and the rear in-throw harrow 2, are of usual construction, the front harrow being provided with a frame comprising a cross bar 3, brace bars 4, and links 5 pivotally connected with the outer bearings 6 upon which the shafts 7 of the forward gangs are swung to and from parallel relation; and the rear harrow being provided with a frame comprising a cross bar 3', brace bars 4', connected directly with outer bearings 6' in which the shaft 7' of the rear gangs are swung to and from parallel relation.

Laterally spaced angle bars 8 extend from the cross bar 3 to the brace bars 4 in the median line of the front frame, and form a longitudinal guideway 9 in which the front draft bar 10 is adapted to operate; and laterally spaced bars 8' extend from the cross bar 3' forward between the brace bars 4' in the median line of the rear harrow frame, and form a guideway 9' in which the rear draft bar 10' is adapted to operate.

In the front frame, the angle bars 8 are preferably spaced above the cross bar 3 and brace bars 4, upon the plates 11, and the front draft bar 10 is preferably in the form of an inverted T, with its flanges operating and guided in the space 12 between the angle bars and the frame members. An anti-friction roller 13 is preferably mounted on the cross bar 3, below the rear end of the front draft bar, and an anti-friction roller 14 is preferably mounted on the angle bars 8 above the forward end portion of the front draft bar 10 to carry the same freely forward and rearward in its adjustments as against the downward tilting tendency of the front frame; and the guide block 16 may also be mounted on the angle bars above the rear end of the front draft bar for further guiding its movement.

In the rear frame, the guide bars 8' are connected by U-plates 15 and 15', the yokes of which are provided with square apertures 17, and the rear draft bar 10' is preferably square in section for operating in the guide apertures 17. An anti-friction roller 13' is preferably mounted on the bars 8' below the rear end of the rear draft bar, and an anti-friction roller 14' is preferably mounted on the forward end of the bars 8' above the rear draft bar 10', to carry the same freely forward and rearward in its adjustments as against the downward tilting tendency of the rear frame.

A connecting plate 18 is secured to the under side of the rear end of the front draft bar whence it extends rearwardly and upwardly and thence rearward, and is provided with an aperture 19 in its rear end, which receives the vertical pivot 20 depending from the forward end of the rear draft bar 10', thus forming a single central pivotal connection between the front and rear draft bars.

The forward movement of the front draft bar is positively stopped by the abutment of the connecting plate 18 with the flange of the cross bar 3, as shown in Fig. 8, and the rearward movement of the same draft bar, is positively stopped by a cross pin 21, entered through one of a number of transverse apertures 22 in the forward end of the draft bar. The forward movement of the rear draft bar 10' is stopped by the abutment of the plate 23 secured to the lower side of the bar with the yoke of the U-plate 15' as shown in Fig. 8, and the rearward movement of the same draft bar is stopped by the cross pin 21' secured in one of the transverse apertures 22' in the forward end of the bar.

The upper edges of the forward draft bar is provided with a number of notches 24, each having square rear sides and inclined forward sides, and a corresponding detent 25 is pivotally mounted in a bracket 26 secured to the angle bars 8, for engaging in the notches to stop a forward movement of the draft bar while freely permitting a rearward movement thereof. A like series of notches 24' is provided in the upper side of the rear draft bar 10', and a similar detent 25' is pivoted in a bracket 26' mounted on the rear guide bars 8' for operating in said notches to stop a forward and permit a rearward movement of the draft bar.

Upright arms 27 and 27' are secured to the detents 25 and 25', and the operation of the detents is coordinated by a cable 28 connecting the free ends of the upright arms, and extending forward to within reach of the driver of a tractor or other draft means; it being understood that by pulling the cable forward, the detents will both be released from the notches, and that by releasing the cable, the detents are free to drop down by gravity or the force of springs, as 25'', to engage the notches in the respective draft bars.

Connecting bars 29 are pivoted at the forward end to ears 30 depending from the forward draft bar and at their rear ends to the inner bearings 31 of the front gang shafts, so that a longitudinal movement of the front draft bar with respect to the front frame, serves to swing the gangs horizontally upon their outer bearings 6; suitable anti-tilting guide brackets 32 being provided for the connecting bars 29 in the usual manner.

Connecting bars 29' are pivoted at their forward end to plates 23 and 30' secured to the lower side of the draft bar 10, and corresponding links 29'' are pivoted at their rear ends to the inner ends of the rear gang frames 33. The adjacent ends of the connecting bars 29' and corresponding links 29'', are connected to the ends of crossed levers 34, which are pivoted at 35 to a bracket 36 secured to the under side of the guide bars 8'; and it is evident that a longitudinal movement of the rear draft bar with reference to the rear frame, will swing the rear gangs to and from parallel relation, in a reverse direction from the movement of the rear draft bar. Spaced apertures 34' may be provided for the pivots in the ends of the crossed links for the purpose of differentiating the angularity of the rear gangs for hill side work or other similar situation.

The improved harrow is designed primarily to be drawn and operated by a tractor, which may be connected to the draft bar by means of an L-shaped hitch bar 37 pivotally connected at the rear end of its longer arm to a bracket 38 secured to the under side of the front draft bar, and adjustably connected by its shorter arm to the forward end of the draft bar; and it is evident that any push or pull given to the front draft bar, will be communicated through the single pivot connection 20 to the rear draft bar, so that the longitudinal operation of the two bars may be said to be integral.

Longitudinal movement with respect to the harrow frames, may be given to the draft bars by means of an operating lever 39, pivotally connected to the forward end of the front draft bar and fulcrumed on the segment frame 40 pivoted on the bracket 26 secured to the guide bars 8 of the forward frame; and it is evident that by this lever, which extends forward to within reach of the driver, the forward draft bar can be moved forward and rearward with reference to the front harrow frame, and that this movement will be transmitted directly to the rear draft bar, just the same as though it were caused by a tractor or other draft means. A rack and dog 39' may be employed for locking the front draft bar in operative position, and when used, the detent 25 may be omitted.

When the harrow is now in operation, it is driven along a road or across a field with its gangs swung parallel to each other, as shown in Fig. 1, which parallel relation causes the disks to roll over the ground like a wheel without any harrowing action. When, however, it is desired to swing the gangs into the operating position shown in Fig. 2, the detents are disengaged from the notches in the draft bars, by a forward pull upon the cable 28, and the draft bars are pushed backward by the tractor or other means. The draft bars being free to slide endwise with reference to the harrow frames, the rearward movement of the forward draft bar acts through the connecting bars 29 directly upon the inner ends of the front gangs to push the same rearward, and the like rearward movement of the rear draft bar, acts indirectly through the connecting bars and links and the crossed levers to draw the inner ends of the rear gangs forward.

In this operation, it is evident that the engagement of all the disks with the ground serves to hold the frames from rearward movement while the draft bars are acting to swing the gangs, which tendency is accentuated by the fact that the gangs swing upon vertical pivots located adjacent to their outer ends; and furthermore, the reverse movement given to the inner ends of the rear gangs by the crossed levers, assists the engagement of the ground with the disks in holding the harrow frames from rearward movement while the gangs are being swung on their vertical pivots.

As the gangs are swung to operative angles, as shown in Fig. 2, they are locked in this position by the engagement of the detents 25 with one of the notches 24, depending upon the degree of angularity desired, so that the machine can be drawn forward by pulling upon the draft bars in the usual manner; and the single central pivot by which the forward end of the rear draft bar is connected to the rear end of the front draft bar, permits the rear harrow to properly trail after the front harrow, in straight forward working relation, as shown in Fig. 1, and deflecting around an obstacle or turning corners in the manner well known for this type of harrows; it being understood that suitable slide guides 41 are preferably provided to prevent a downward tilting of the inner ends of the rear gangs.

When it is desired to provide an operating lever for swinging the gangs into angular operative position, it is evident that a forward pull on the free end of the lever serves to move the front draft bar rearward by positive action with reference to the front frame, and that this movement is communicated directly to the rear draft bar, so that the gangs will be swung into angular relation, just the same as if the movement were given by a rearward push of a tractor.

The gangs being in angular operative position as shown in Fig. 2, if it is desired to swing them into straight or parallel relation, it is only necessary to pull the cable 28 forward, which releases the detents from the draft bars, and for the driver to manually release the dog from the rack if a lever is used. As the tractor moves forward, the pull on the draft bar is communicated directly by the connecting bars 29 to the inner ends of the forward gangs, which draws them forward into parallel relation. The like forward pull upon the rear draft bar acts reversely through the connecting bars and links and the crossed levers 29', to push the inner ends of the rear gangs backward to swing the gangs in parallel relation; the forward movement of each draft bar being stopped by the respective abutments when the gangs are parallel with each other and perpendicular to the line of draft as shown in Fig. 1.

In all these operations, the single central pivot which connects the front and rear harrows, gives the maximum flexibility to the harrow sections and disk gangs, without in any manner interfering with, or being interfered with by the described means for swinging the gangs into parallel or angular relation at any time, as may be desired; and the gangs are angled and straightened without changing the distance between the front and rear harrow frames, so that the same can be connected together as a rigid frame, if desired.

And finally, the use of an operating lever is not essential, but it is preferred to use the same in cases where the harrow is drawn by horses or other means which cannot readily push the draft bars backward; and it is evident that the flexible connection between the draft bars is not necessary for the operation of the angling and straightening means, but such flexibility is preferred for the reasons well known in the art.

I claim:—

1. A harrow having front and rear sections, each having swinging disk gangs and frames forming median longitudinal guides in the forward ends thereof, connected draft bars in the median line of the respective sections movable endwise in the respective guides, connections for swinging the front gangs one way and the rear gangs the other way by a longitudinal movement of the draft bars.

2. A harrow having front and rear sections each having swinging disk gangs and frames forming median longitudinal guides, connected draft bars movable endwise in the guides, connections for swinging the front gangs one way and crossed lever connections for swinging the rear gangs the other way by a longitudinal movement of the draft bars.

3. A harrow having front and rear sections each having swinging disk gangs and frames forming median longitudinal guides in the forward ends thereof, connected draft bars in the median line of the respective sections movable endwise in the respective guides, connections between the draft bars and corresponding gangs for straightening the gangs by pulling the bars forward and angling the gangs by pushing the bars rearward.

4. A harrow having front and rear sections, each having swinging disk gangs and frames forming median longitudinal guides, connected draft bars movable endwise in the guides, connections between the front bar and gangs and crossed lever connection between the rear bar and gangs for straightening the gangs by pulling the bars forward and angling the gangs by pushing the bars rearward.

5. A harrow having front and rear sections each having swinging disk gangs and frames forming madian longitudinal guides in the forward ends thereof, connected draft bars in the median line of the respective sections movable endwise in the respective guides, connections between the draft bars and corresponding gangs for straightening the gangs by pulling the bars forward and angling the gangs by pushing the bars rearward, and releasable means for locking the gangs in different angled positions.

JONATHAN M. STEWART.